(12) United States Patent
Shimada

(10) Patent No.: US 9,961,217 B2
(45) Date of Patent: May 1, 2018

(54) ELECTRONIC APPARATUS WITH INSTRUCTION RECEPTION UNIT RECEIVING INSTRUCTION INDICATED BY USER AND COMPUTER-READABLE MEDIUM WITH PROGRAM

(71) Applicant: SEIKO EPSON CORPORATION, Tokyo (JP)

(72) Inventor: Masayoshi Shimada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 13 days.

(21) Appl. No.: 14/920,384

(22) Filed: Oct. 22, 2015

(65) Prior Publication Data

US 2016/0219168 A1 Jul. 28, 2016

(30) Foreign Application Priority Data

Jan. 22, 2015 (JP) ................................ 2015-010735

(51) Int. Cl.
*H04N 1/00* (2006.01)
*H04N 1/32* (2006.01)

(52) U.S. Cl.
CPC ..... *H04N 1/00355* (2013.01); *H04N 1/00363* (2013.01); *H04N 1/00376* (2013.01); *H04N 1/00411* (2013.01); *H04N 1/00968* (2013.01); *H04N 1/32042* (2013.01); *H04N 2201/0094* (2013.01)

(58) Field of Classification Search
CPC .......... H04N 1/00363; H04N 1/00355; H04N 1/00376; H04N 1/00381
See application file for complete search history.

(56) References Cited

U.S. PATENT DOCUMENTS

| | | | | |
|---|---|---|---|---|
| 2009/0021798 | A1* | 1/2009 | Abahri | H04N 1/195 358/474 |
| 2012/0075679 | A1* | 3/2012 | Christensen | H04N 1/00366 358/474 |

FOREIGN PATENT DOCUMENTS

| | | | | |
|---|---|---|---|---|
| EP | 0622722 A2 | * | 11/1994 | H04N 1/00381 |
| JP | 2004-070023 A | | 3/2004 | |

* cited by examiner

*Primary Examiner* — Christopher D Wait

(57) ABSTRACT

An instruction position specifying unit which specifies a position of an indicator, a target detecting unit which detects a mark of a medium, an instruction reception unit which receives an instruction corresponding to a position which is indicated by a user using the indicator based on the detected mark, and a processing unit which performs a process corresponding to the received instruction are included.

9 Claims, 18 Drawing Sheets

ELECTRONIC APPARATUS WITH INSTRUCTION RECEPTION UNIT RECEIVING INSTRUCTION INDICATED BY USER AND COMPUTER-READABLE MEDIUM WITH PROGRAM

BACKGROUND

1. Technical Field

The present invention relates to an electronic apparatus which includes an imaging unit.

The entire disclosure of Japanese Patent Application No. 2015-010735, filed Jan. 22, 2015 is incorporated by reference herein.

2. Related Art

An electronic apparatus includes a user interface for performing a specific function. As the user interface, there are various interfaces such as a physical switch, a touch panel which displays an icon on a screen, and a screen which is transposed on a screen.

An electronic apparatus in recent years includes a plurality of functions, and a user operation becomes remarkably complicated. When displaying a screen on which a specific function is set on a UI screen, there also is a case in which the screen should pass through a plurality of screens until being displayed. There also is a method in which ease of use is improved by mounting a large touch panel with a size of approximately 10 inches; however, there is a limitation in size of a product, and there also is a case in which mounting of a large touch panel is difficult. In addition, it is also technically possible to operate the apparatus using a smart phone or a tablet; however, it is also considered that a user avoids such an operation, since it is necessary to perform an installing operation of an application or a connection operation with the electronic apparatus.

In JP-A-2004-070023, as a user interface of which an object is to enable a user to simply perform setting of an apparatus, the following invention is disclosed. In the invention, a mark sheet on which by the number combinations of setting of a product is marked is prepared. The product images the prepared mark sheet using an imaging unit, and discriminates setting which is designated in the mark sheet from the imaged image.

The invention which is disclosed in JPA-2004-070023 has the following problem. It is necessary for a user to mark sheets by the number of setting items. When the setting items increase, it is also necessary to prepare a plurality of mark sheets, not only items for marking, and it leads to an increase in load on a user.

SUMMARY

An advantage of some aspects of the invention is to provide a user interface in which workability of a user is increased when operating functions of a product.

According to an aspect of the invention, there is provided an electronic apparatus which includes an instruction position specifying unit which specifies a position of an indicator; a target detecting unit which detects a mark of a medium; an instruction reception unit which receives an instruction corresponding to a position which is indicated by a user using the indicator based on the detected mark; and a processing unit which performs a process corresponding to the received instruction. The electronic apparatus may include an imaging unit which images an indicator; an instruction position specifying unit which specifies a position of the indicator from an imaging result; a target detecting unit which detects a mark of a medium which is indicated by the indicator from a position of the specified indicator; an instruction reception unit which receives an instruction which is indicated by a user using the indicator based on the detected mark; and a processing unit which performs a process corresponding to the received instruction.

The "medium" is used in order for a user to visually determine an instruction which is made with respect to an electronic apparatus, and may be any of paper, a display, and the like, on which characters, figures, or the like, denoting the instruction are denoted.

Any of "indicator" which is used to indicate a medium by a user, such as a finger or a pen can be adopted.

Any of "mark" which can be detected in an imaged image such as a barcode, a QR code (registered trademark), characters, and a symbol may be used.

The expression "receiving an instruction corresponding to a position which is indicated by a user using the indicator based on the detected mark", or "receiving an instruction corresponding to a medium which is indicated by a user using an indicator based on a detected mark" means that various cases such as cases in which an instruction correlated with a medium is received using a position of the medium which indicates a position of a mark are also included, in addition to a case in which a medium is specified from information which is specified by a shape of a mark, and an instruction correlated with the medium is received.

In the invention which is configured as described above, it is possible for a user to make an instruction with respect to an apparatus using an intuitive operation such as an instruction of a medium using an indicator, since an electronic apparatus receives an instruction of a user according to a mark which is indicated using the indicator. In addition, since an operation is completed when a user indicates a medium using an indicator, there is no throwaway mark sheet, and there is no burden imposed on a user which causes the user to prepare a new mark sheet every time.

In addition, the invention is not limited to an apparatus which has such a function, and can be understood as a program which executes the function related to the invention in a specific apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
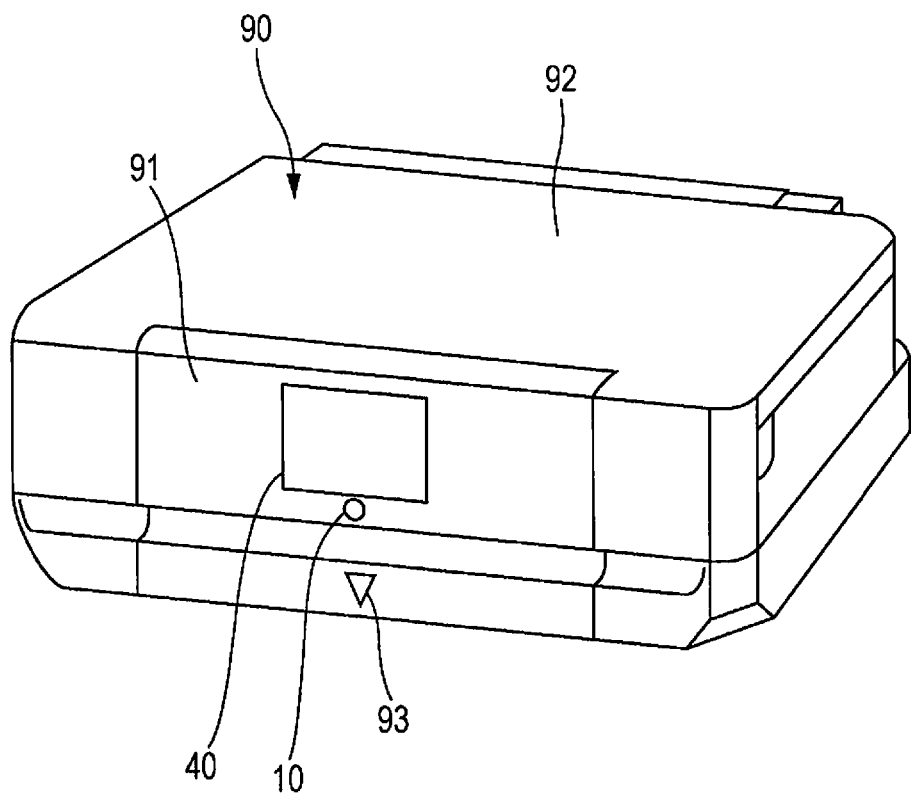
FIG. 1 is a diagram which illustrates an appearance of a multifunction printer as an example.

Hereinafter, embodiments of the invention will be described according to the following order.
1. First Embodiment
(1) Configuration of multifunction printer
(2) Configuration of paper manual
(3) Function setting method
(4) Operation and effects of invention
2. Second Embodiment
3. Third Embodiment
4. Other embodiments:

1. First Embodiment (1) Configuration of Multifunction Printer

Hereinafter, a multifunction printer 100 will be described as an example of an electronic apparatus. The multifunction printer 100 has a printing function in which a coloring material is recorded on a sheet, a scanning function in which a document is read, and a faxing function in which the document is transmitted.

FIG. 1 is a diagram which illustrates an appearance of the multifunction printer 100 as an example. The multifunction printer 100 is wrapped with a casing 90. The casing 90 accommodates a printer unit, a scanner unit, a fax unit, and the like, which are not illustrated in FIG. 1. A front panel 91 to which a camera module 10 which functions as an imaging unit, and a display unit 40 are attached is attached to the front part of the casing 90 so as to be opened and closed. A positioning mark 93 for positioning a paper manual which will be described later is formed at the lower part of the camera module 10 in the front panel 91. The front panel 91 also functions as a cover which covers a path in which a sheet on which a coloring material is recorded is discharged. A higher cover 92 which covers a document table on which a document is set is attached to the higher part of the casing 90 so as to be opened and closed.

Figure 2:
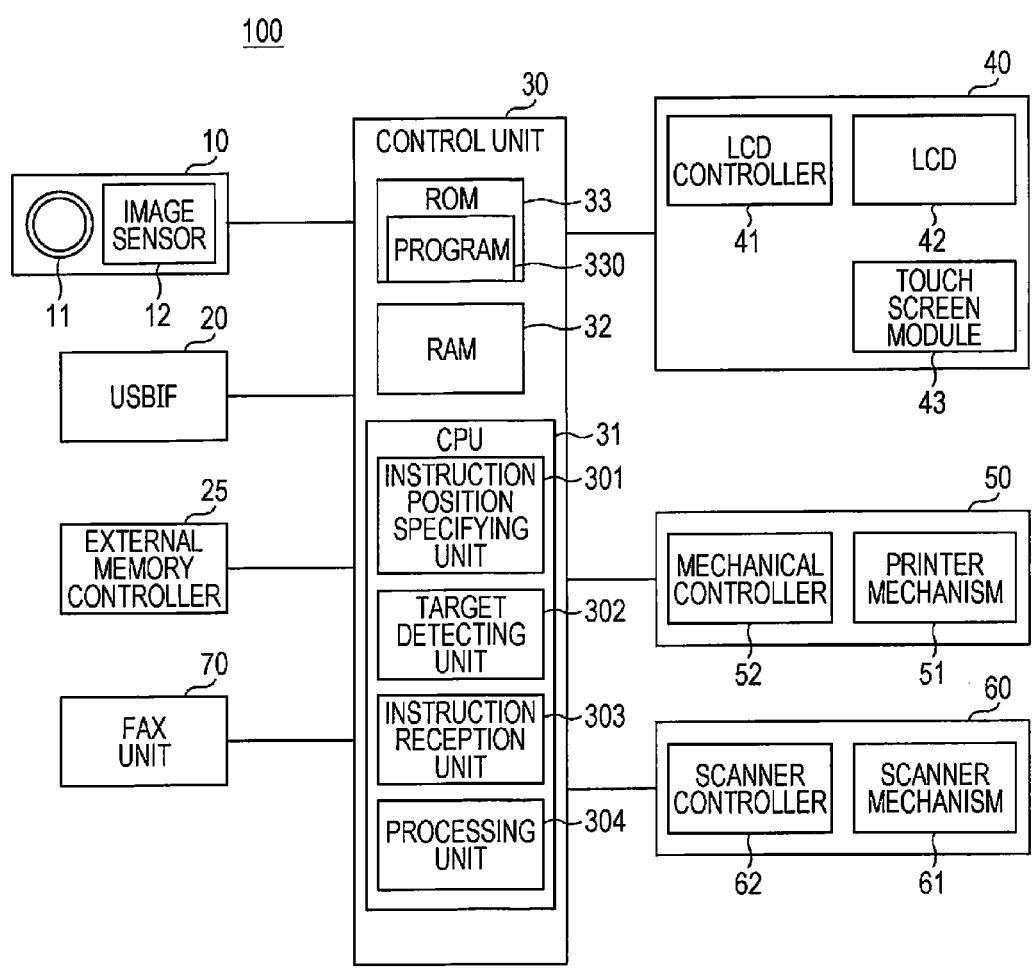
FIG. 2 is a block diagram which illustrates a hardware configuration of the printer.

FIG. 2 is a block diagram which illustrates a hardware configuration of the printer. The multifunction printer 100 includes the camera module 10, a USBIF 20, an external memory controller 25, a control unit 30, a display unit 40, a printer unit 50, a scanner unit 60, and a fax unit 70. The control unit 30 functionally includes an instruction position specifying unit 301, a target detecting unit 302, an instruction reception unit 303, and a processing unit 304. The camera module 10, the USBIF 20, the external memory controller 25, the display unit 40, the printer unit 50, the scanner unit 60, and the fax unit 70 are electrically connected to the control unit 30.

The camera module 10 includes a lens block 11 which collects light, and an image sensor 12 which converts the light which is collected using the lens block 11 into an electric signal. The lens block 11 includes one lens, or a plurality of lenses, and collects light from the front side. The image sensor 12 includes an imaging element such as a well-known CMOS image sensor or CCD image sensor, and a register. The image sensor 12 converts light which is collected by the lens block 11 into an electric signal using an imaging element. The converted electric signal is recorded in the register as an imaged image Im, and is output to the control unit 30 in a constant period thereafter.

The USBIF 20 communicates with an external device such as a PC (not illustrated) using a protocol which is in compliance with a USB standard. For this reason, the multifunction printer 100 can receive data for printing from the PC through the USBIF 20.

The external memory controller 25 is connected to an external memory, and can communicate with the external memory. It is possible to record data for printing which is processed in a printing process, or document data which is read in a scanning process. The external memory is, for example, a non-volatile memory such as a flash memory, or an SD memory.

The control unit 30 is configured of, for example, a well-known system on chip (SoC), and includes a CPU 31, a RAM 32, and a ROM 33. The RAM 32 functions as a work area of the CPU 31. In addition, in the RAM 32, imaged data ImD which is output from the camera module 10 is temporarily recorded. The CPU 31 analyzes data for printing using a program which is recorded in the ROM 33, and generates information for driving the printer unit 50. In addition, the CPU 31 controls reading of a document using the scanner unit 60, or transceiving of document data using the fax unit 70, using the program which is recorded in the ROM.

In addition, the ROM 33 records a program 330 for executing each function of the instruction position specifying unit 301, the target detecting unit 302, the instruction reception unit 303, and the processing unit 304 in the CPU 31. That is, the control unit 30 executes each function of an instruction position specifying function, a target detecting function, an instruction reception function, and a processing function. Each unit will be described in detail later.

The display unit 40 includes an LCD controller 41, and an LCD 42. When receiving display image data from the control unit 30, the LCD controller 41 generates driving data for driving the LCD 42 based on the display image data. In the LCD 42, the number of liquid crystal pixels corresponding to a resolution is arranged, and the LCD displays an image by driving each pixel based on driving data. In addition, the display unit 40 includes a touch screen module 43 so as to execute a function for detecting an operation of a screen by a user.

The printer unit 50 includes a printer mechanism 51 which records a coloring material on a sheet, or a mechanical controller 52 which generates an electric signal for driving the printer mechanism 51 based on driving data which is output from the control unit 30. Since each unit which configures the printer unit 50 is a well-known technology, detailed descriptions thereof will be omitted.

The scanner unit 60 includes a scanner mechanism 61 which reads a document which is set on the document table, and a scanner controller 62 for driving the scanner mechanism. Since each unit which configures the scanner unit 60 is a well-known technology, detailed descriptions thereof will be omitted.

The fax unit 70 transmits document data which is generated by being read using the scanner unit 60 to an external device through a telephone line or an Internet line which is not illustrated.

(2) Configuration of Paper Manual

Figure 3:
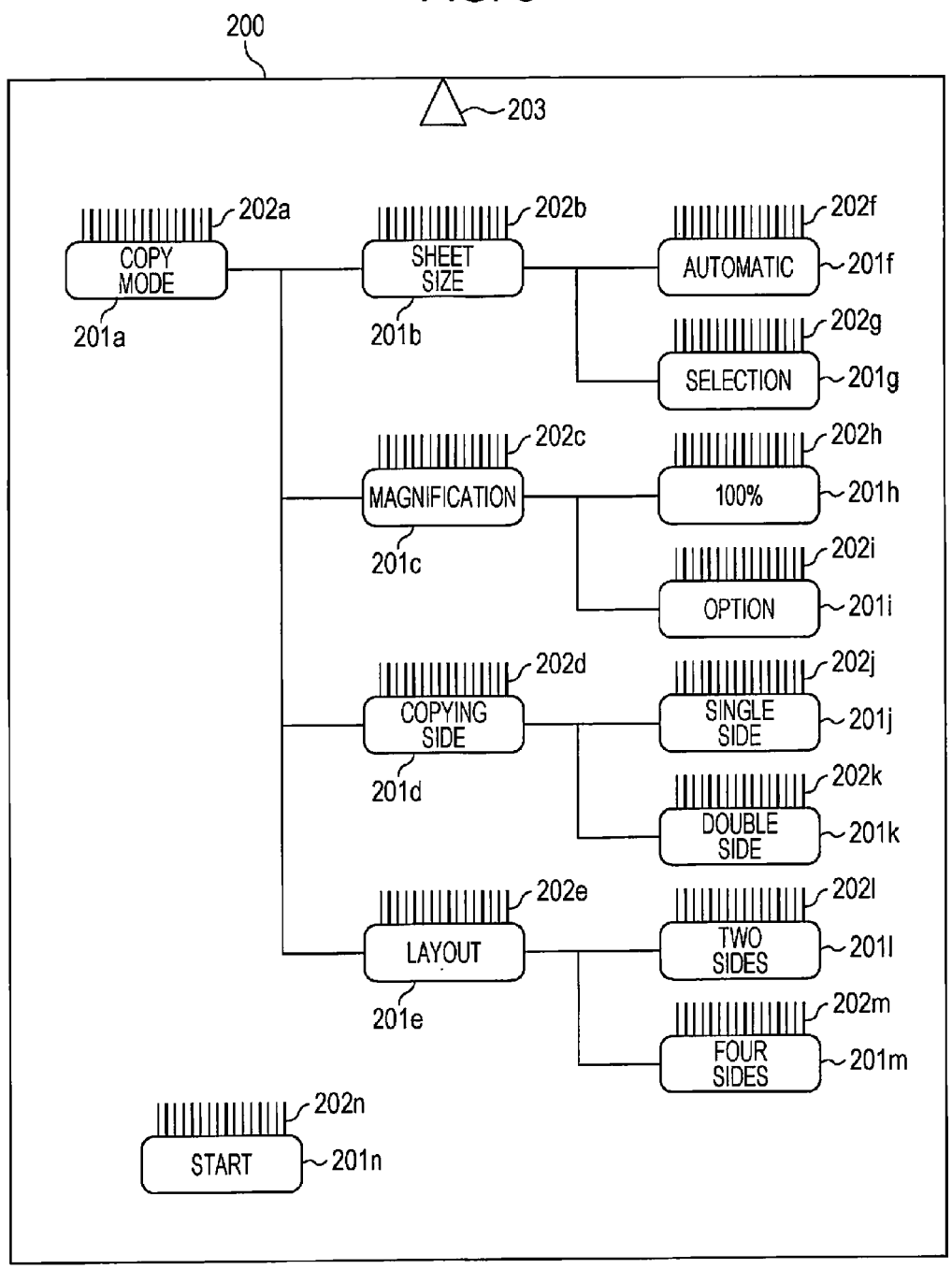
FIG. 3 is a diagram which describes a paper manual which is used when setting the multifunction printer.

FIG. 3 is a diagram which describes a paper manual 200 which is used when setting the multifunction printer 100. The paper manual 200 is used when a user performs inputting of various setting of the multifunction printer 100 by indicating a medium which is described in the paper manual 200. FIG. 3 illustrates a page to which setting of a "copy mode" which is performed using the scanner unit 60 and the printer unit 50 is input, in the paper manual 200. The paper manual has a plurality of pages, and it is possible to set all of setting which are performed with respect to the multifunction printer 100 using any one of the pages. In addition, the same setting may be performed using a plurality of pages.

In the paper manual 200, diagrams for indicating 201a to 201n which function as mediums as indicating targets, barcodes 202a to 202n which function as marks in the first embodiment, and a positioning mark 203 which is used as a mark when setting the paper manual 200 are recorded. Hereinafter, when being described as a diagram for indicating 201, it is a general term for all of diagrams for indicating which are recorded in the paper manual 200. In addition, when being described as a barcode 202, it is a general term for all of barcodes which are recorded in the paper manual 200.

A tree diagram is configured in the paper manual 200 when each of diagrams for indicating 201a to 201m are correlated with each other using node, and it is easy for a user to ascertain a relationship between each of diagrams for indicating. In the tree diagram, respective functions of a "sheet size" 201b, a "magnification" 201c, a "copying side" 201d, a "layout" 201e are correlated with each other using node by having the "copy mode" 201a as a root. In addition, "automatic" 201f and a "selection" 201g are correlated with the "sheet size" 201b, "100%" 201h and "option" 201i are correlated with the "magnification" 201c, a "single side" 201j and "double side" 201k are correlated with the "copying side" 201d, and "two sides" 2011 and "four sides" 201m are correlated with the "layout" 201e using the node.

In addition, the diagram for indicating 201n which denotes a "start" for inputting a start of copying is formed in the paper manual 200. Also in other pages of the paper manual 200, setting contents which are set in the page are described in the diagram for indicating, and a unique barcode is described next to each of the diagram for indicating in each setting.

Barcodes 202a to 202n are respectively formed on the higher part of each of the diagrams for indicating 201a to 201n. Each of the barcodes 202a to 202n includes contents of functions which are denoted by each of the diagrams for indicating 201a to 201n which respectively correspond thereto.

(3) Function Setting Method

Figure 4A:
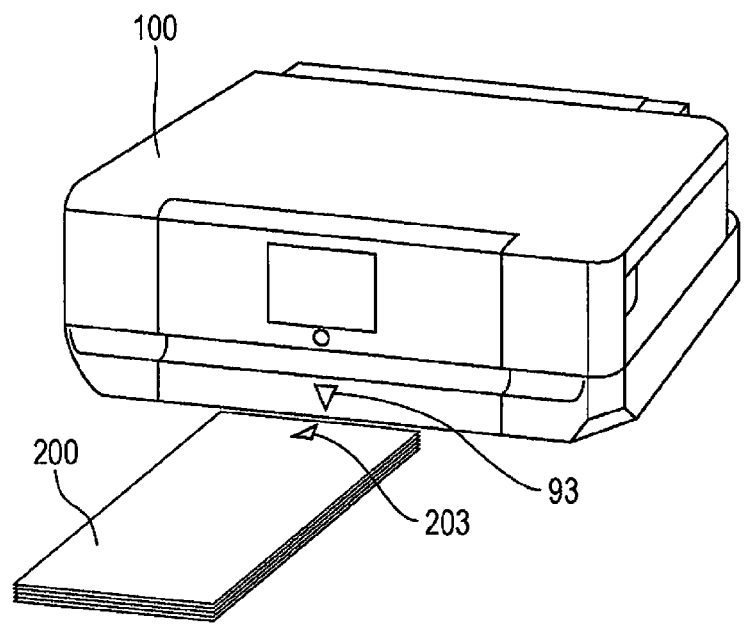
FIGS. 4A and 4B are diagrams which describe usage of the paper manual.
Figure 4B:
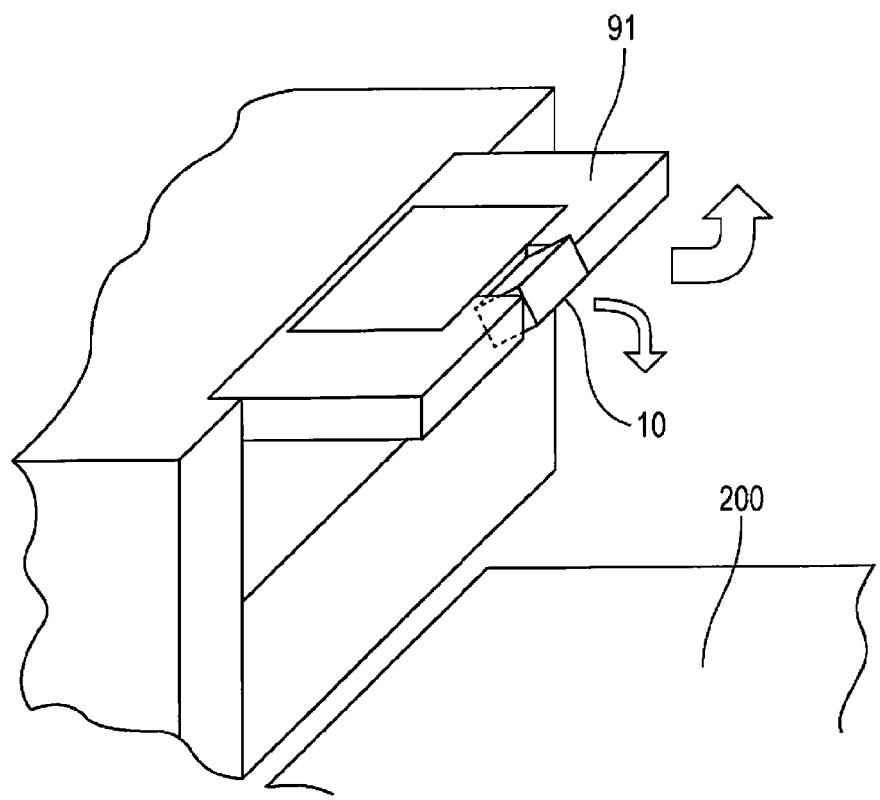

Subsequently, a function setting method using the multifunction printer 100 and the paper manual 200 will be described. FIGS. 4A and 4B are diagrams which describe a usage of the paper manual 200. First, prior to pointing of the paper manual 200 by a user, the paper manual 200 is arranged on the front side of the multifunction printer 100 (FIG. 4A). At this time, a positioning mark 203 of the paper manual 200 is aligned with the positioning mark 93 which is formed in the front panel 91. Subsequently, as illustrated in FIG. 4B, the front panel 91 is opened toward the higher part, and an imaging direction of the camera module 10 is rotated toward the paper manual 200. When the control unit 30 detects that the position of the camera module 10 is changed to an instruction reception position, it is determined to be a start of a function start process.

Figure 5:
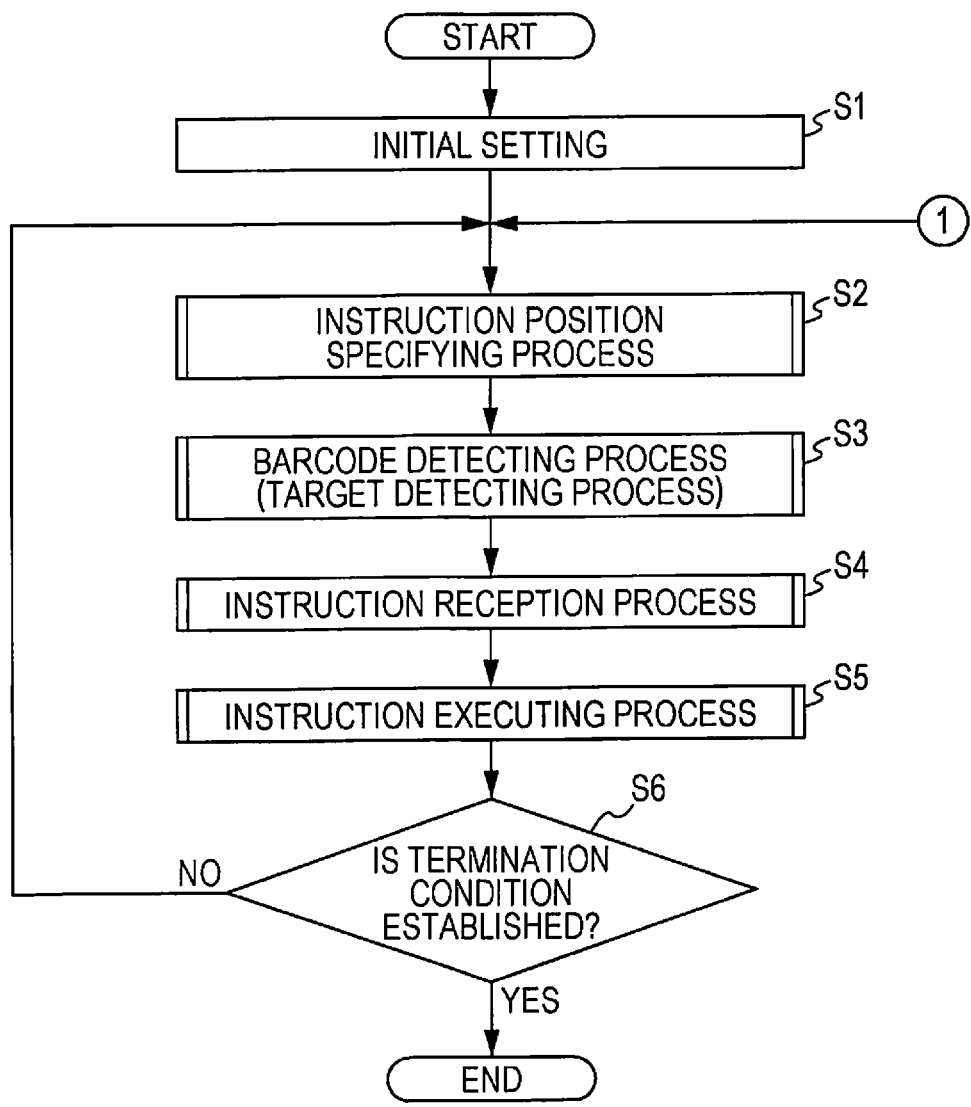
FIG. 5 is a flowchart which describes a function setting process which is performed by a control unit.

FIG. 5 is a flowchart which describes a function setting process which is executed by the control unit 30. The function setting process illustrated in FIG. 5 is executed when the control unit 30 executes the program 330 which is recorded in the ROM 33.

First, in step S1, the control unit 30 performs initial setting.

In the initial setting, for example, setting of a parameter for an inclination correction in which an inclination of the imaged image Im is corrected, or a distortion correction in which a distortion of a shape of the imaged image Im is corrected is performed.

Subsequently, in step S2, the control unit 30 performs an instruction position specifying process in which a position of the paper manual 200 which is indicated by a user is specified. In the instruction position specifying process, a position of an indicator (coordinates) is specified after the instruction position specifying unit 301 performs a correction such as the inclination correction, the distortion correction, or a brightness correction with respect to the imaged image Im from a result of imaging. Hereinafter, a fingertip of a user is used as the indicator. The indicator with which the instruction position specifying unit 301 specifies a position may be an indicator other than the fingertip, and for example, a pointer, or the like, can be recognized as an indicator by setting the pointer in the control unit 30 in advance.

Subsequently, in step S3, the control unit 30 performs a barcode detecting process (target detecting process) based on the position which is specified in step S2. In the barcode detecting process, the target detecting unit 302 detects the barcode 202 on the paper manual 200 which is indicated by a fingertip from coordinates of the fingertip which is specified.

Subsequently, in step S4, the control unit 30 performs an instruction reception process based on the detected barcode. In the instruction reception process, the instruction reception unit 303 receives an instruction which is indicated by a user using a fingertip.

In addition, in step S5, the control unit 30 performs an instruction executing process in which the instruction which is received in step S4 is executed. In the instruction executing process, the processing unit 304 performs a process corresponding to the instruction which is obtained using the barcode 202.

When a termination condition is not established (No in step S6), the process in the control unit 30 returns to step S2. For example, the termination condition can be assumed as various conditions, such as a case in which a user changes a direction of the camera module 10. When the termination condition is established (Yes in step S6), the control unit 30 ends the process.

Figure 6:
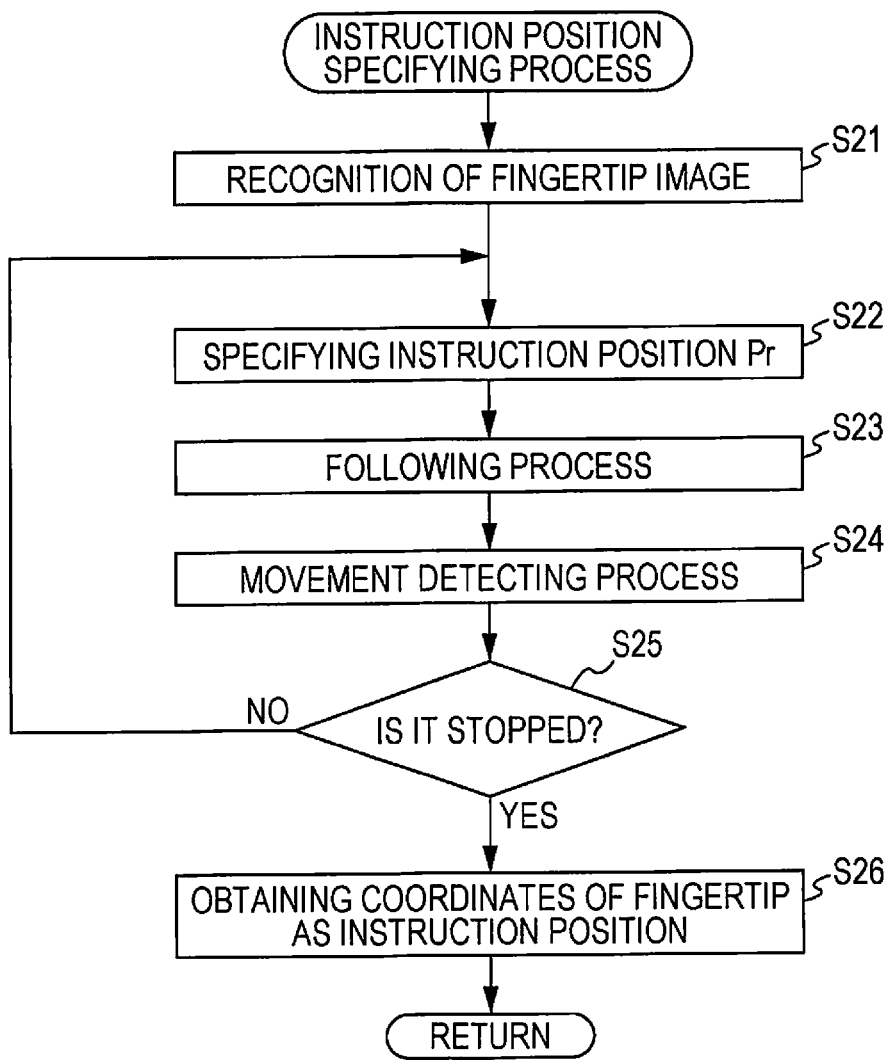
FIG. 6 is a flowchart which describes an instruction position specifying process.
Figure 7A:
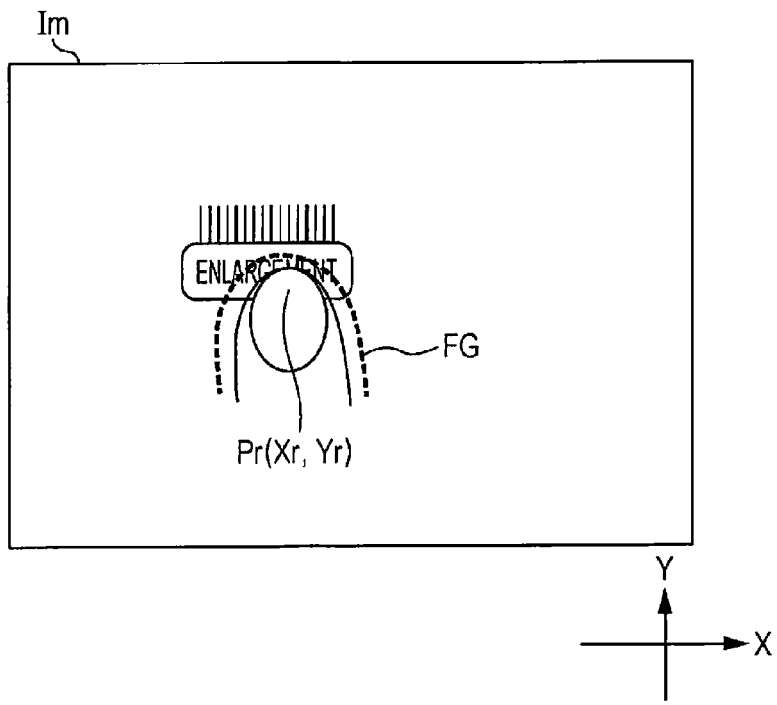
FIGS. 7A and 7B are diagrams which describe the instruction position specifying process.
Figure 7B:
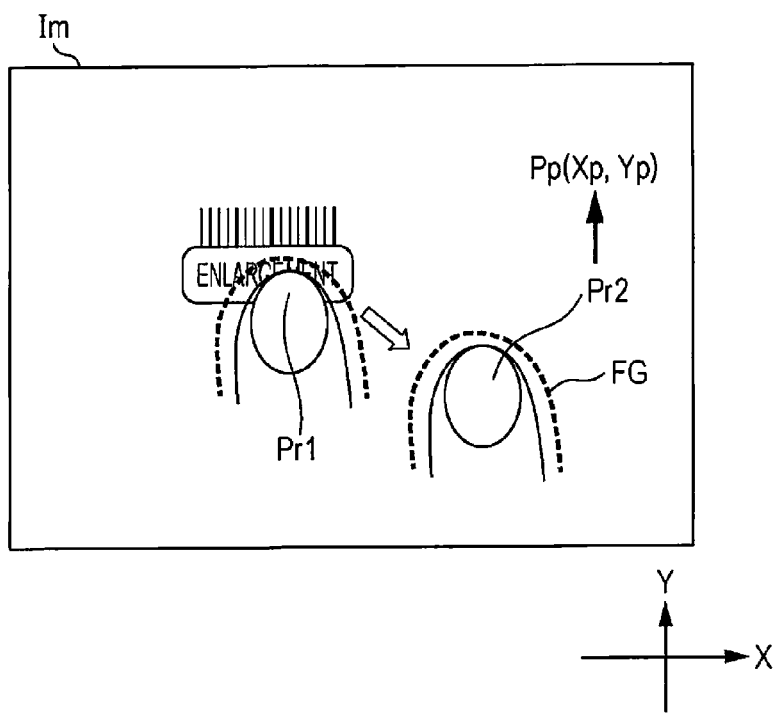

Subsequently, the instruction position specifying process which is performed in step S2 in FIG. 5 will be described. FIG. 6 is a flowchart which describes the instruction position specifying process. FIGS. 7A and 7B are diagrams which describe the instruction position specifying process. In the following diagram, only a portion of the imaged image Im in which descriptions are necessary will be illustrated and denoted. In practice, in the imaged image Im, all of diagrams for indicating 201 and barcodes 202 which are described in pages of the paper manual 200 are included.

In step S21 in FIG. 6, the instruction position specifying unit 301 recognizes an image (fingertip image FG) corresponding to a fingertip included in the imaged image Im in which the correction of the inclination correction, the distortion correction, the brightness correction, or the like, is performed. For example, when a user stretches out a hand to the higher part of the paper manual 200, as illustrated in FIG. 7A, the instruction position specifying unit 301 recognizes a specified finger (for example, index finger) as the fingertip image FG from the imaged image Im which is included in a detecting region of the camera module 10. Recognizing of the fingertip image FG is performed by focusing the camera module 10 on the fingertip image FG. It is possible to determine whether or not the paper manual 200 is touched as information of a depth direction which is three-dimensional by determining whether or not entering a depth of field. In addition, as a method of specifying the fingertip image from the imaged image Im, it is possible to use a well-known method such as a pattern matching method.

In step S22, the instruction position specifying unit 301 obtains a position Pr (Xr, Yr) of the fingertip image FG which denotes a position in the imaged image Im using two-dimensional coordinates (X, Y) by recognizing the fingertip image FG.

In step S23, the instruction position specifying unit 301 performs a following process which follows the fingertip image. In the following process, the fingertip image FG after moving is continuously recognized by moving a lens, and by focusing the lens on the fingertip, even when the fingertip image FG which is recognized in step S21 is moved.

In step S24, the instruction position specifying unit 301 performs a movement detecting process in which whether or not the fingertip image FG is moved is detected. In the movement detecting process, whether or not there is a change in the movement of the fingertip image FG in a predetermined period is detected. In FIG. 7B, a position of the fingertip image FG is changed from the position Pr1 to the position Pr2 in the predetermined period.

When the fingertip is not stopped (No in step S25), the instruction position specifying unit 301 returns to step S22, and specifies the instruction position Pr, and performs a following process in step S23. That is, the instruction position specifying unit 301 continues following of the fingertip image FG.

When the fingertip is stopped (Yes in step S25), the instruction position specifying unit 301 obtains a current position of the fingertip as the instruction position in step S26. For example, when a position of the fingertip image FG is not changed from the position Pr2 for a predetermined time, after the change of the fingertip image FG illustrated in FIG. 7B, the position Pr2 is obtained as an instruction position Pp (Xp, Yp).

Figure 8:
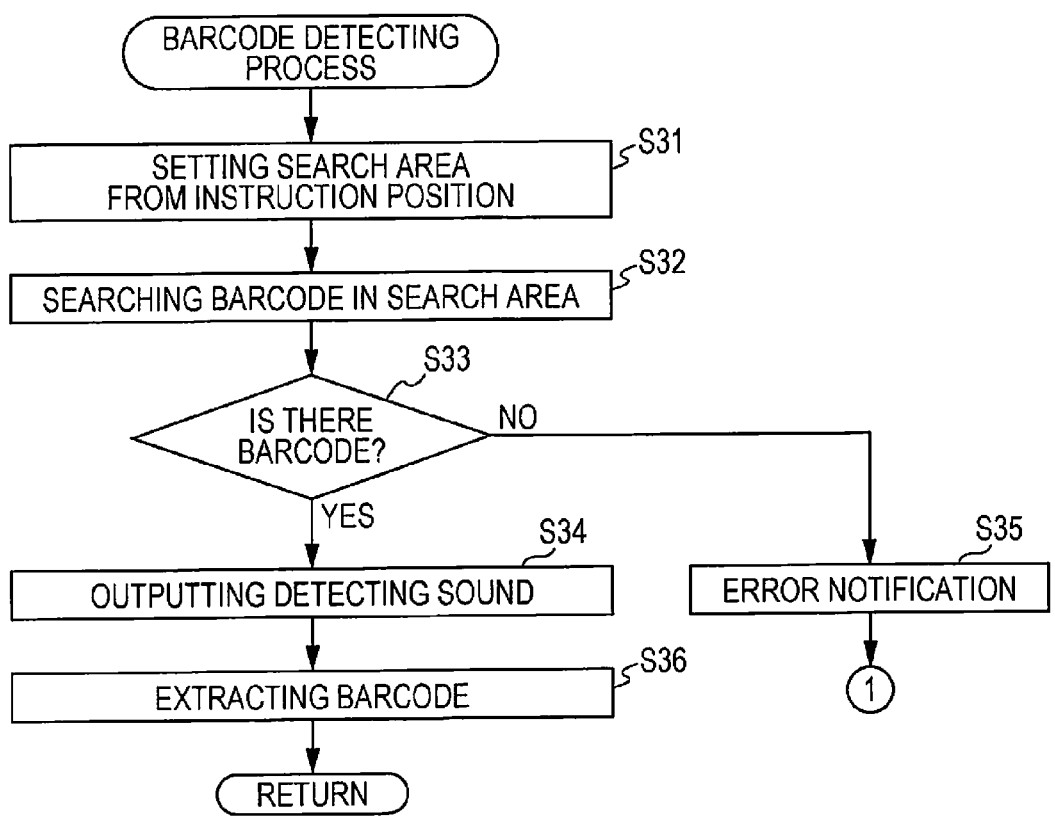
FIG. 8 is a flowchart which describes a barcode detecting process.
Figure 9A:
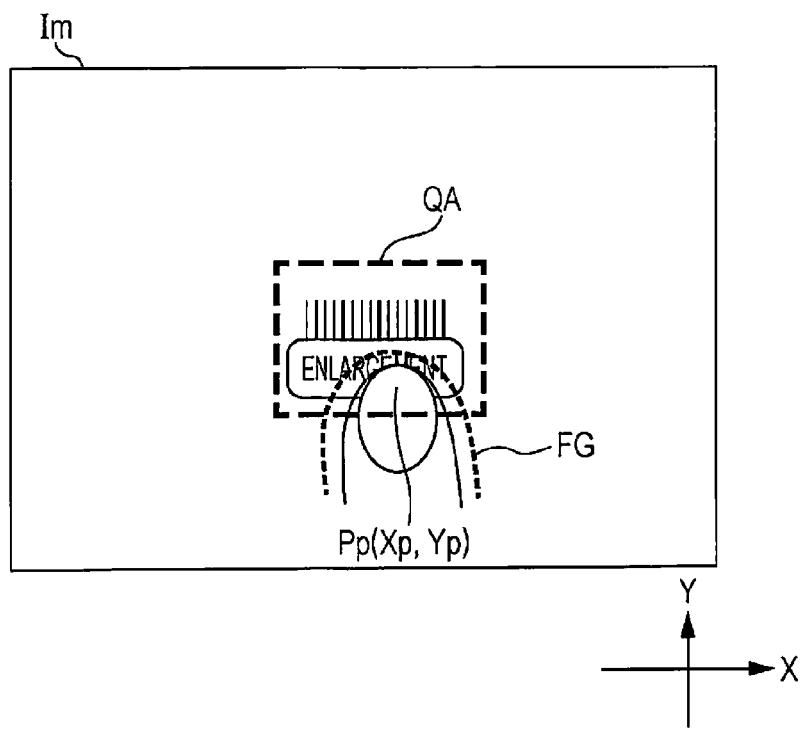
FIGS. 9A and 9B are diagrams which describe the barcode detecting process.
Figure 9B:
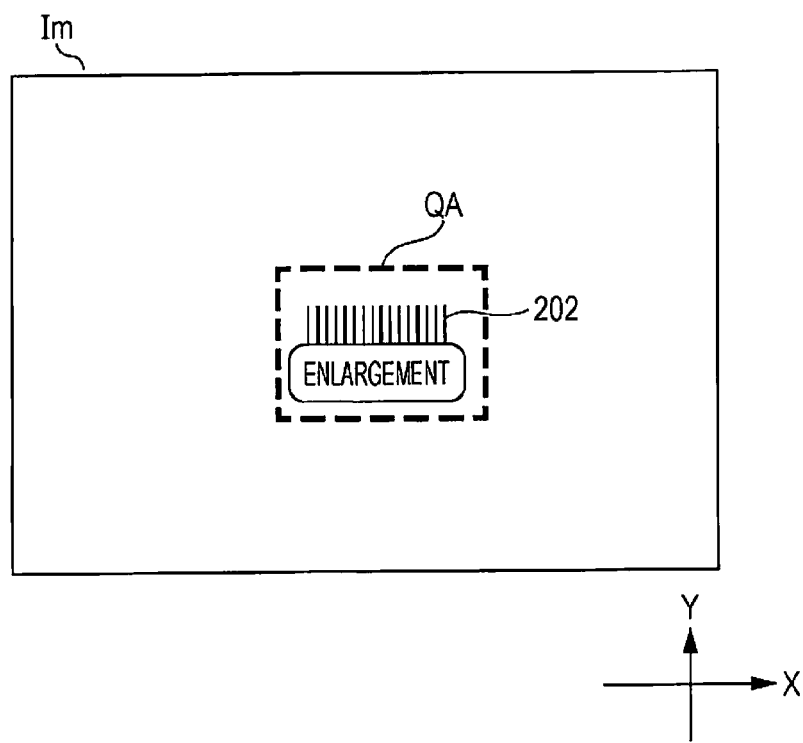

Subsequently, the barcode detecting process (target detecting process) which is performed in step S3 in FIG. 5 will be described. FIG. 8 is a flowchart which describes the barcode detecting process. FIGS. 9A and 9B are diagrams which describe the barcode detecting process.

In step S31, the target detecting unit 302 sets a search area QA from the instruction position Pp. The search area QA is an area (pixel) as a target in which a barcode included in the imaged image Im is searched, and is set based on the instruction position Pp. In FIG. 9A, as an example, a rectangular area in the vicinity of the instruction position Pp including the instruction position is set to the search area QA.

In step S32, the target detecting unit 302 searches for a barcode which is included in the search area QA. For example, the target detecting unit 302 searches whether or not there is an image corresponding to a barcode in the depth of field of the camera module 10 in the search area QA. In addition, in the depth of field, it is set so that a barcode is not included in the depth of field when a fingertip is stopped in the air, and the barcode is included in the depth of field when the fingertip touches a page of the paper manual 200.

When the barcode 202 is not detected, (No in step S33), the process returns to FIG. 5, and the control unit 30 performs specifying of the instruction position Pp again.

On the other hand, when the barcode 202 is detected (Yes in step S33), in step S34, the target detecting unit 302 outputs a detecting sound. The detecting sound may be any sound which can notify a user detecting of the barcode 202. In FIG. 9B, the barcode 202 is detected in the search area QA.

In step S36, the target detecting unit 302 extracts the detected barcode 202 from the imaged image Im. The extracted barcode image is used in a process which is performed by the instruction reception unit 303.

Subsequently, the instruction reception process which is executed in step S4 in FIG. 5 will be described.

Figure 10:
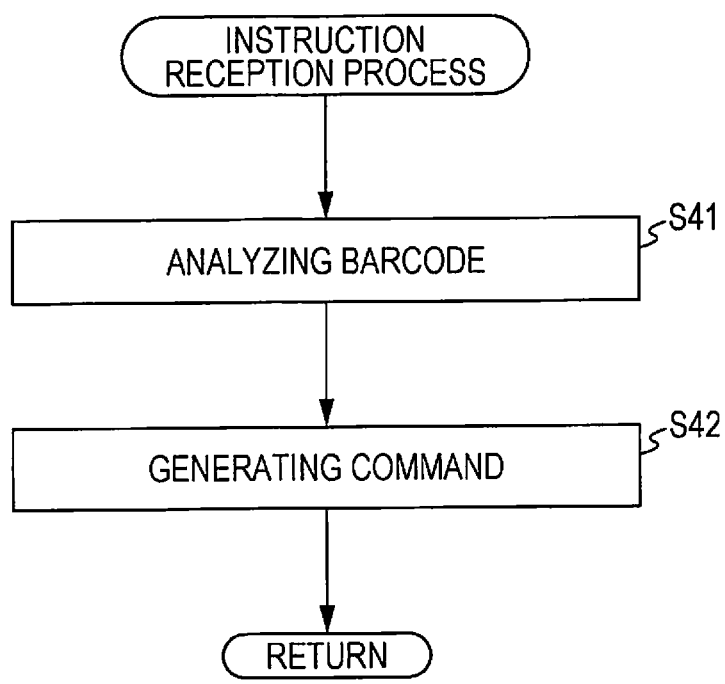
FIG. 10 is a flowchart of an instruction reception process.

FIG. 10 is a flowchart of the instruction reception process.

In step S41, the instruction reception unit 303 analyzes the barcode 202 which is extracted using the target detecting unit 302. Information which can uniquely specify the diagram for indicating 201 which is described in the paper manual 200 is included in the barcode 202. For example, when a diagram which is indicated by a user is the diagram for indicating 201h ("100%" which belongs to "magnification"), the instruction reception unit 303 determines that an instruction of the user is a process for setting copy magnification in a copy mode to "100%", by analyzing the barcode 202h.

In step S42, the instruction reception unit 303 generates a command from the analyzing result in step S41. In the example in which the barcode 202h is analyzed, the instruction reception unit 303 generates a command for setting the copy magnification in the copy mode to "100%".

Hereinafter, the processing unit 304 executes the command which is analyzed by the instruction reception unit 303 (instruction executing process in FIG. 5: step S5). That is, in the multifunction printer 100, setting which is instructed by a user by indicating the paper manual 200 is executed. In this manner, the user sets copy conditions of an automatic paper size, a magnification of 100%, and double-sided copying in order, when the "automatic" 201f, the "100%" 201h, and the "double side" 201k of the paper manual 200 are touched in order, and an operation is performed so that copying is started on a set condition, when the user touches the "start" 201n thereafter.

(4) Operation and Effect of Invention

As described above, since the multifunction printer 100 according to the first embodiment receives an instruction of a user using a barcode (mark) corresponding to a position which is instructed by a user using a finger (indicator), it is possible for the user to make an instruction using an intuitive operation such as instructing of a medium on the paper manual 200. In addition, since an operation ends when a user simply makes an instruction using a finger when there is the paper manual 200, there is no burden of preparing a mark sheet for the user.

When a barcode (mark) is located in the depth of field in which a finger is recognized, since it is determined that the barcode is specified, it is possible to further appropriately perform detecting of the barcode.

Since the barcode uniquely specifies contents of an instruction, it is possible to prevent the multifunction printer 100 from misrecognizing the instruction from the user.

It is possible for the camera module 10 to correctly detect a barcode in the paper manual 200, since the multifunction printer 100 includes a positioning unit which denotes a position to which a user is caused to set the paper manual 200.

Since the multifunction printer 100 includes a reception mode in which an instruction of a user is received through a detecting target by corresponding to the fact that the camera module 10 is moved to an instruction reception position, it is possible to prevent an erroneous operation of the multifunction printer 100.

2. Second Embodiment

Figure 11:
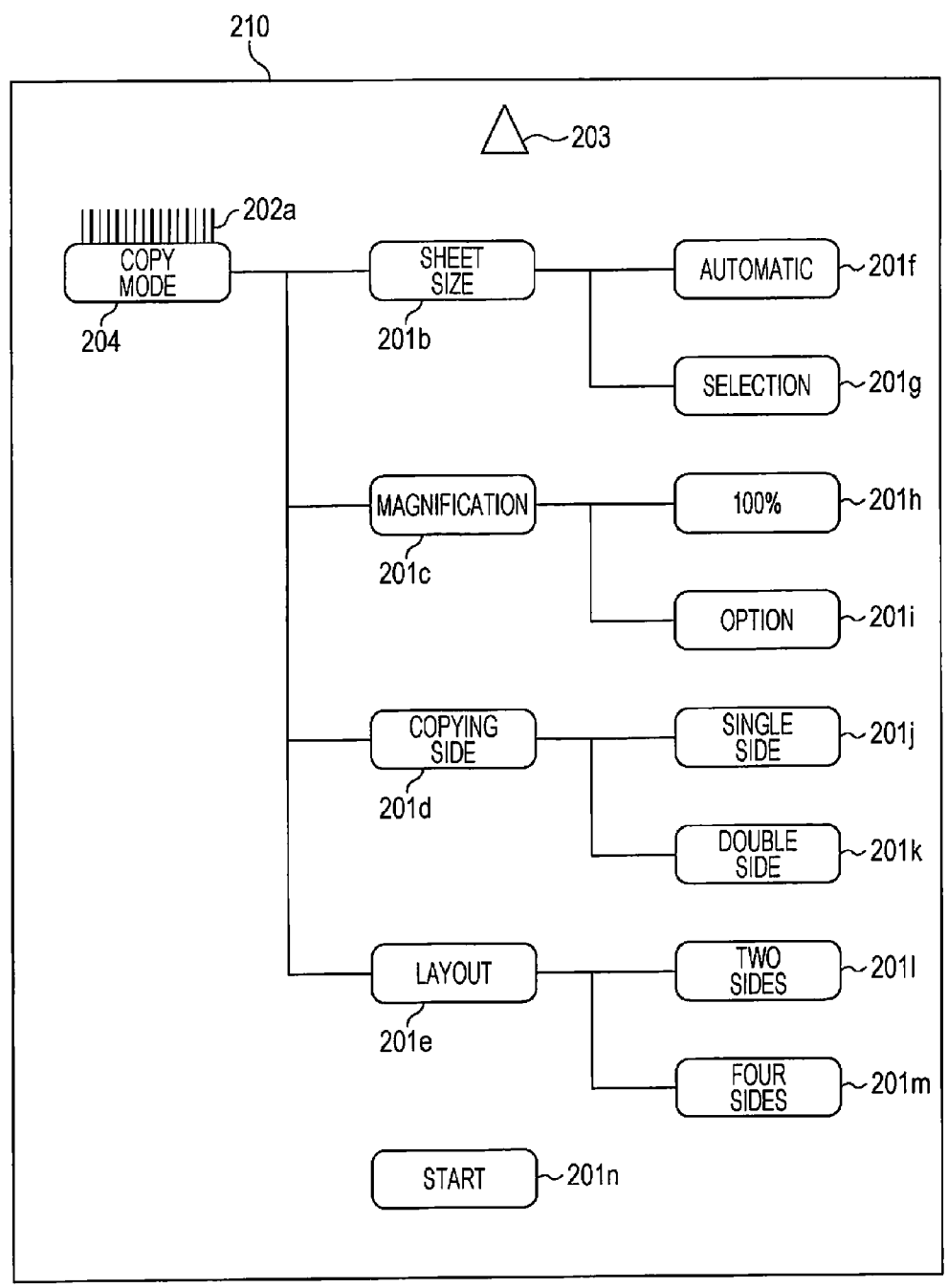
FIG. 11 is a diagram which describes a paper manual which is used in a second embodiment.

FIG. 11 is a diagram which describes a paper manual 210 which is used in a second embodiment. Also in the second embodiment, the paper manual 210 is used when operating a diagram for indicating 201 (201b to 201n in FIG. 11) which is described in the paper manual 210 by a user. Meanwhile, in the paper manual 210 according to the second embodiment, a barcode 202a is formed only in a reference diagram 204 which functions as a reference point, and barcodes are not formed in the diagrams for indicating 201b to 201n other than that.

Figure 12:
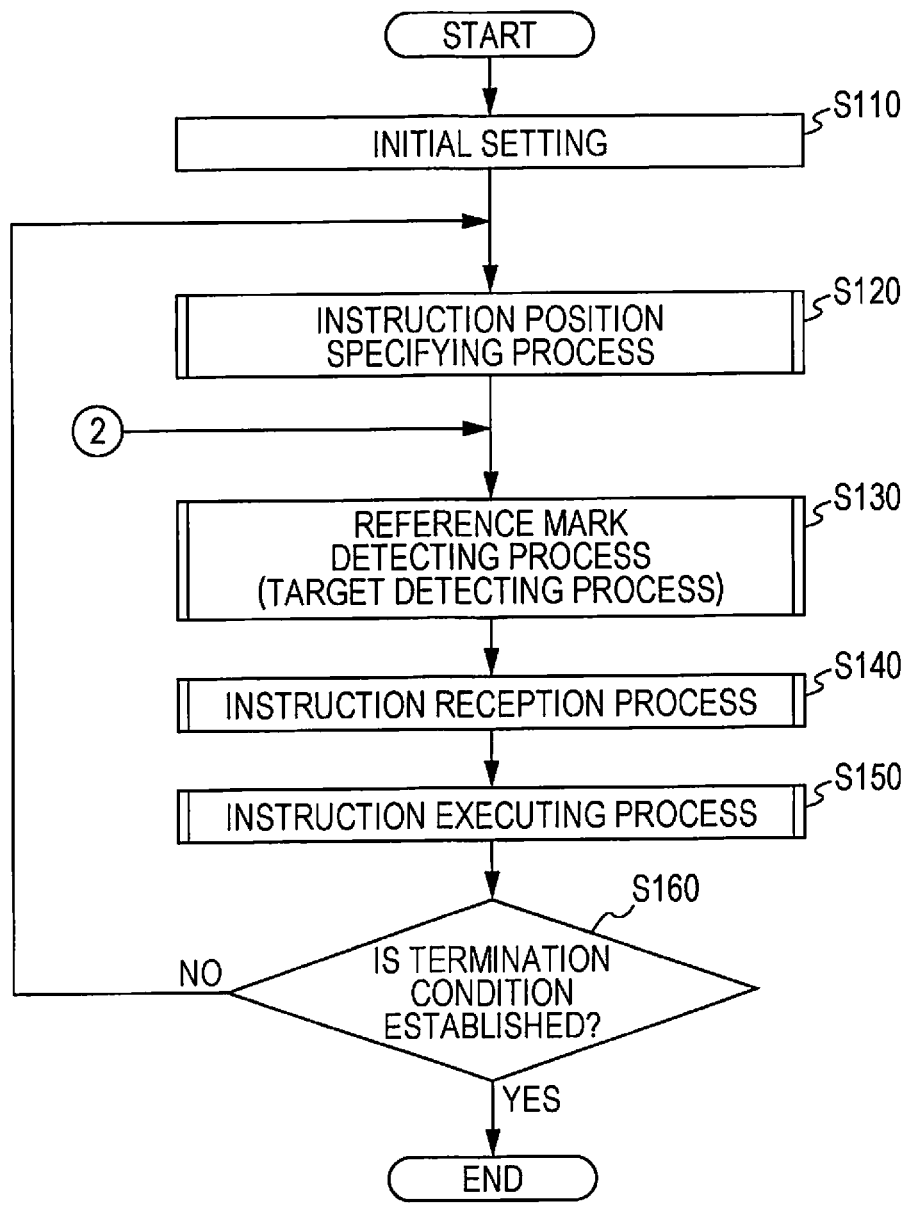
FIG. 12 is a flowchart which describes a setting process which is executed by the control unit in the second embodiment.

FIG. 12 is a flowchart which describes a setting process which is executed by the control unit 30 in the second embodiment. Hereinafter, an outline of the function setting process will be described.

First, in step S110, the control unit 30 performs initial setting, similarly to the first embodiment. Subsequently, in step S120, the control unit 30 performs an instruction position specifying process in which a position of the paper manual 210 which is indicated by a user is specified. In the instruction position specifying process, an instruction with respect to the multifunction printer 100 is made when a user indicates the diagrams for indicating 201b to 201n of the paper manual 210.

In step S130, the control unit 30 performs a reference mark detecting process (target detecting process) in which a mark on the paper manual 210 is detected from an instruction position which is specified in step S120. That is, according to the second embodiment, the target detecting unit 302 detects the barcode 202a which is recorded on the paper manual 210 as a mark.

Subsequently, in step S140, the control unit 30 performs the instruction reception process in which an instruction which is indicated by a user is received based on a relative distance from an indicated position of a user which is specified in step S120 to a position of the reference mark which is specified in step S130. Calculating of the relative distance, and a specific method of receiving an instruction based on the relative distance will be described later.

In addition, is step S150, the control unit 30 executes an instruction which is received in step S140. When a termination condition is established (Yes in step S160), the process ends, and when the termination condition is not established (No in step S160), the process returns to step S120, and is repeated.

Figure 13:
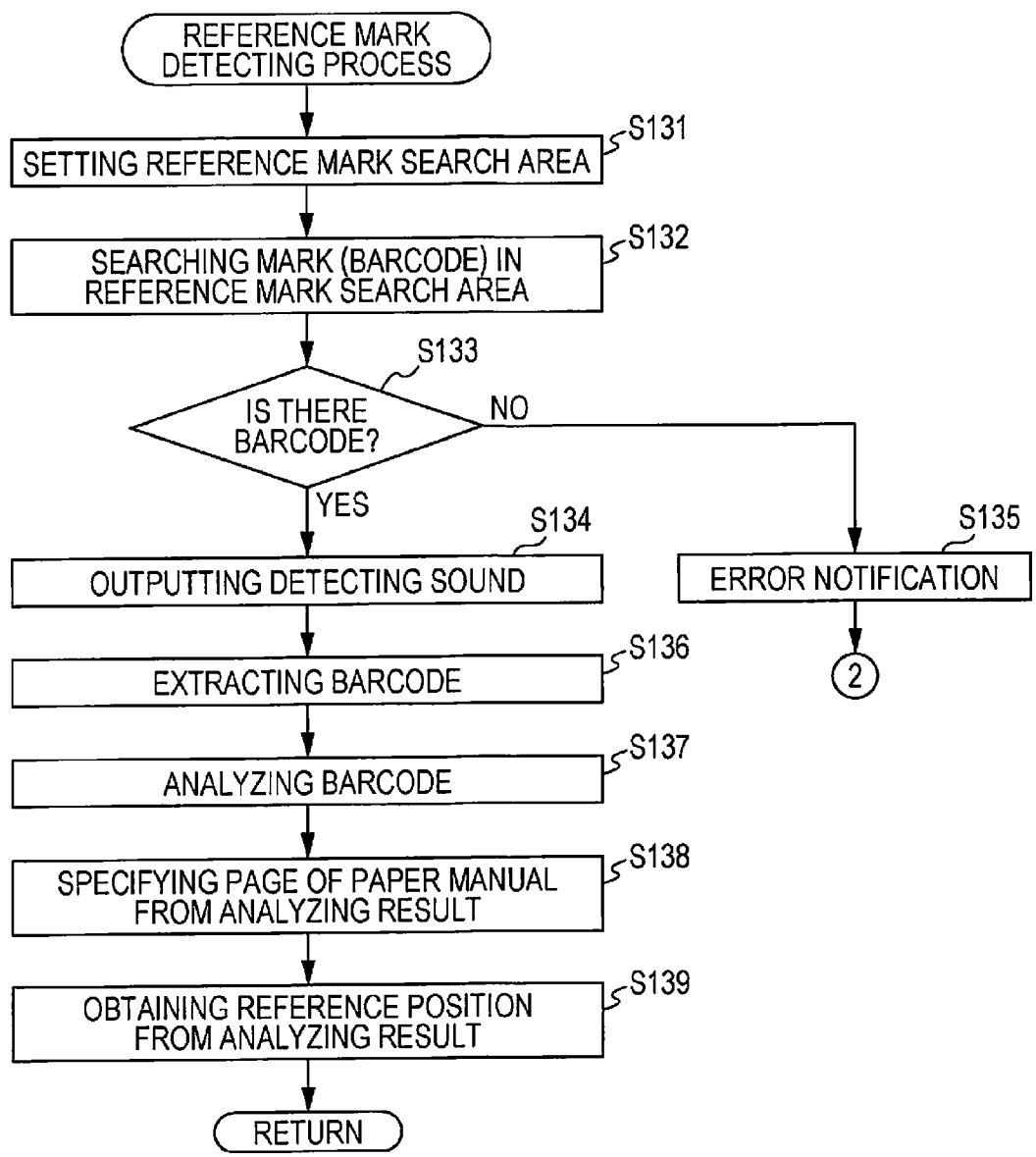
FIG. 13 is a flowchart which describes a reference mark detecting process (target detecting process).

FIG. 13 is a flowchart which describes the reference mark detecting process (target detecting process).

Figure 14A:
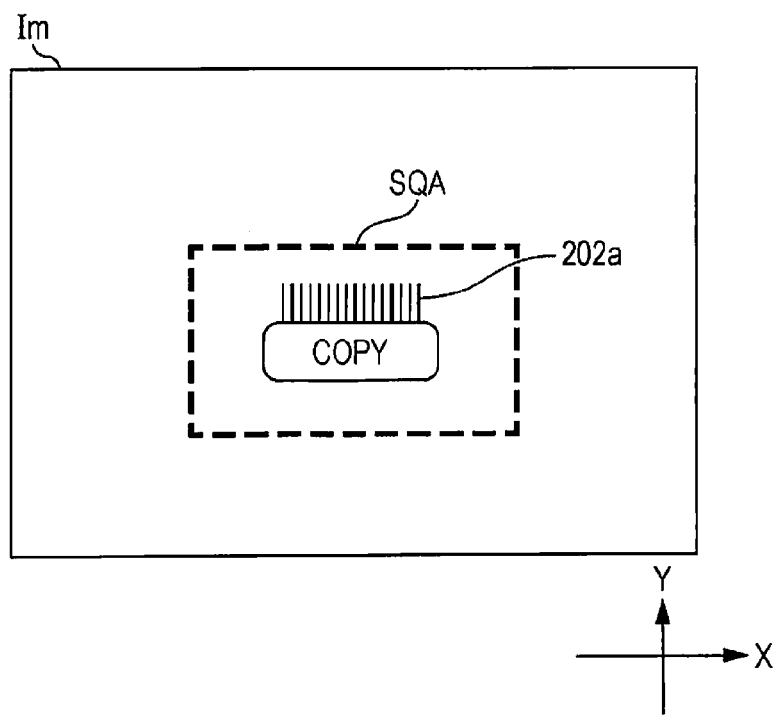
FIGS. 14A and 14B are diagrams which describe the reference mark detecting process.
Figure 14B:
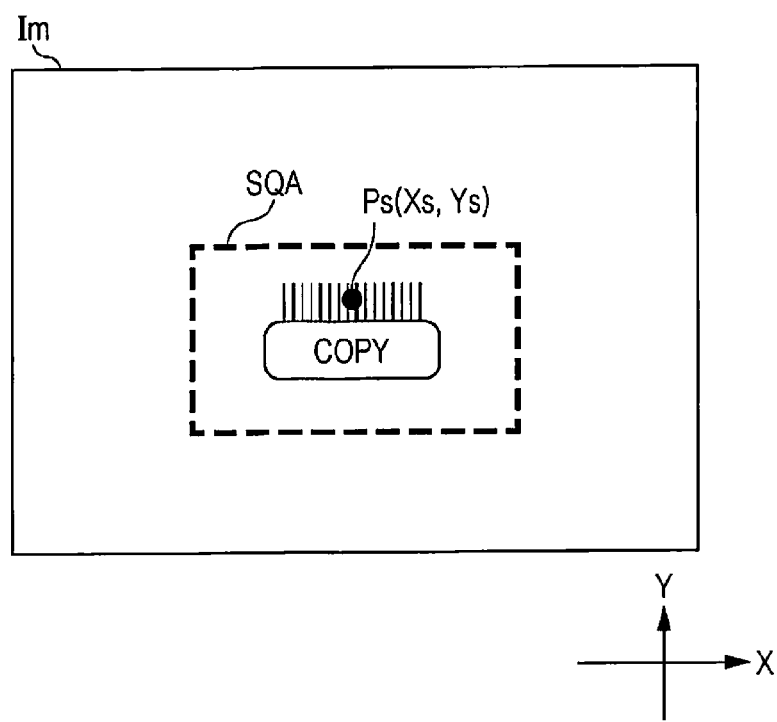

FIGS. 14A and 14B is a diagram which describes the reference mark detecting process.

In step S131 in FIG. 13, the target detecting unit 302 sets a search area (hereinafter, also described as reference mark search area SQA) with respect to a mark (barcode 202a) which is a reference. The reference mark search area SQA is an area for searching for the barcode 202a which functions as a mark which is a reference in the imaged image Im. For example, when the paper manual 210 is set by aligning the positioning mark 203 thereof with the positioning mark 93 of the multifunction printer 100, a position (coordinates) of the reference mark search area SQA is set in the control unit 30 based on an area in which the barcode 202a is located. In FIG. 14A, the reference mark search area SQA is set as an area which is at least wider than the barcode 202a so as to allow deviation of setting of the paper manual 210 with respect to the multifunction printer 100.

In step S132, the target detecting unit 302 searches for the barcode 202a which is included in the reference mark search area SQA. When the barcode 202a is not detected (No in step S133), the target detecting unit 302 performs an error notification in step S135. For example, when the paper manual 210 is not correctly set to the multifunction printer 100, since the barcode 202a is not located in the reference mark search area SQA, an error is notified. The control unit 30 performs the reference mark detecting process again, after performing of a setting correction of the paper manual 210, or the like, by a user (FIG. 12). On the other hand, when the barcode 202a is detected (Yes in step S133), the target detecting unit 302 outputs a detecting sound in step S134.

In step S136, the target detecting unit 302 extracts a barcode image. In step S137, the target detecting unit 302 analyzes the detected barcode. According to the second embodiment, a reference position Ps (xs, ys) which is a reference in the paper manual 210, and identification information for uniquely identifying the paper manual 210 are included in the barcode 202a. In addition, directions of an x axis and a y axis are set, for example, by setting a short side of the page of the paper manual 210 to the direction of the x axis and setting a long side to the direction of the y axis, or setting a direction in which striped bars of the barcode are extended to the direction of the y axis and setting a direction which is orthogonal thereto to the direction of the x axis.

The identification information includes to which setting of the multifunction printer 100 a page indicated by a user corresponds (in case of FIG. 11, automatic setting of sheet size, selection setting of sheet size, magnification setting of 100%, arbitrary setting of magnification, and the like) as information.

In step S138, the target detecting unit 302 specifies a page of the paper manual 210 from the identification information which is analyzed in step S137. For example, In the paper manual 210 which is illustrated in FIG. 12, the barcode 202a includes the fact that a page indicated by a user is setting of a copy function as information.

In step S139, the target detecting unit 302 obtains a reference position Ps (Xs, Ys) which is analyzed in step S137. The reference position Ps is information as a reference for determining an instruction of a user in the instruction reception process which will be executed below. In FIG. 14B, a center of the barcode 202a is set as the reference position Ps. In addition, coordinates (Xs, Ys) of the reference position Ps is obtained from the information which is included in the barcode 202a, and FIG. 14B denotes a concept of the reference position. Ps.

Figure 15:
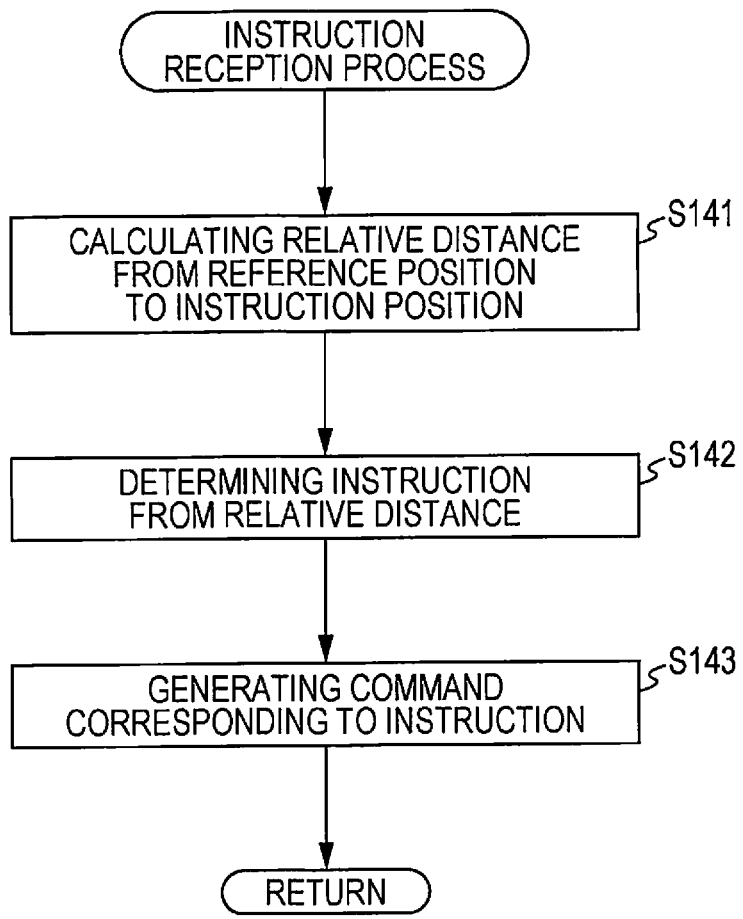
FIG. 15 is a flowchart which describes an instruction reception process in the second embodiment.
Figure 16A:
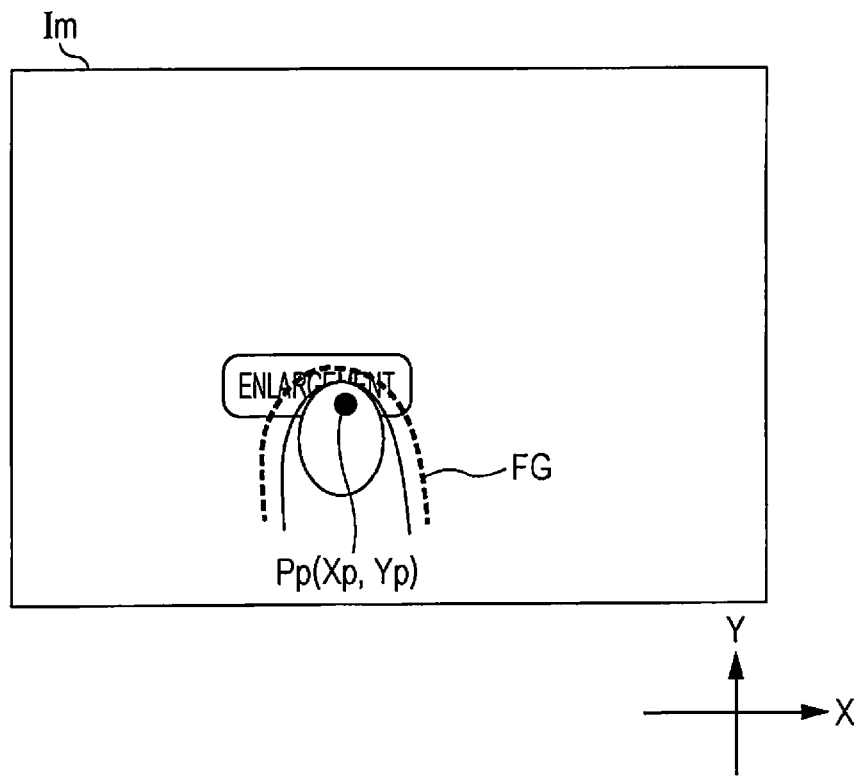
FIGS. 16A and 16B are diagrams which describe the instruction reception process in the second embodiment.
Figure 16B:
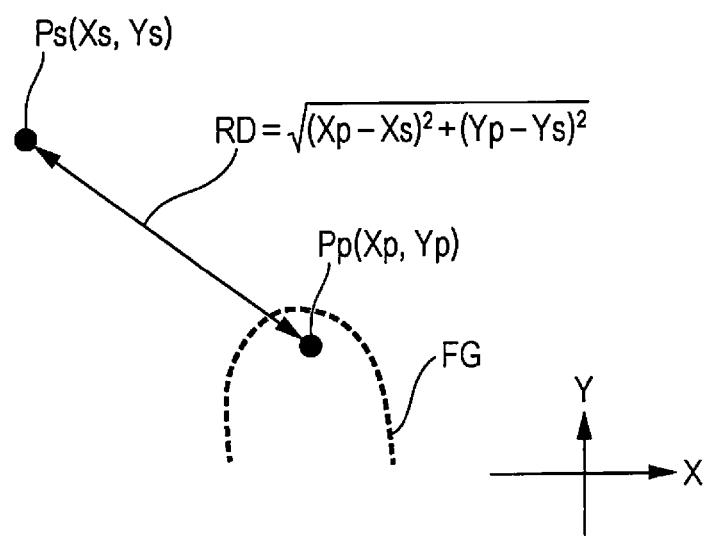

Subsequently, the instruction reception process which is executed in step S140 in FIG. 12 will be described. FIG. 15 is a flowchart which describes the instruction reception process in the second embodiment. FIGS. 16A and 16B are diagrams which describe the instruction reception process according to the second embodiment.

In step S141 in FIG. 15, the instruction reception unit 303 calculates a relative distance from the reference position Ps which is obtained from the reference mark detecting process (step S130) to the instruction position Pp which is obtained from the instruction position specifying process (step S120) (hereinafter, also described as relative distance RD. It may be one-dimensional value, or may be two-dimensional value). For example, as illustrated in FIG. 16A, in the instruction position specifying process (step S120), a current position of a fingertip which is obtained by the instruction reception unit 303 is set to the instruction position Pp. As illustrated in FIG. 16B, the instruction reception unit 303 calculates a difference between the instruction position Pp and the reference position Ps as the relative distance RD. In addition, in FIG. 16B, the relative distance RD is calculated as a distance between the instruction position Pp (Xp, Yp) and the reference position Ps (Xs, Ys), on a plane (X axis, Y axis) which defines the imaged image Im. The relative distance RD in a case of being set to a two-dimensional value is calculated as a distance (Xp-Xs, Yp-Ys) between each of axes of the plane (X axis, Y axis) which defines the imaged image Im.

In step S142, the instruction reception unit 303 specifies an instruction of a user from the relative distance RD which is obtained in step S142. For example, in the ROM, the relative distance RD, and a table for uniquely specifying a command corresponding to each instruction are recorded, in each piece of identification information which uniquely identifies a page of the paper manual 210. The instruction reception unit 303 specifies an instruction which is recorded in the table from an obtained value of the relative distance RD, and determines the specified instruction as an instruction of a user.

In step S143, the instruction reception unit 303 generates a command corresponding to the relative distance RD. For this reason, the processing unit 304 executes the command which is analyzed by the instruction reception unit 303 (step S150 in FIG. 12). In addition, when a command which corresponds to the relative distance RD is not obtained, the instruction reception unit 303 may perform an error notification.

As described above, according to the second embodiment, the number of marks (barcodes) which are formed in the paper manual 210 can be reduced compared to that in the first embodiment, since the multifunction printer 100 determines an instruction of a user based on the relative distance from a position which is indicated by a user to the reference distance. As a result, even when a sheet size of the paper manual is small, it is possible to apply the invention.

3. Third Embodiment

Figure 17:
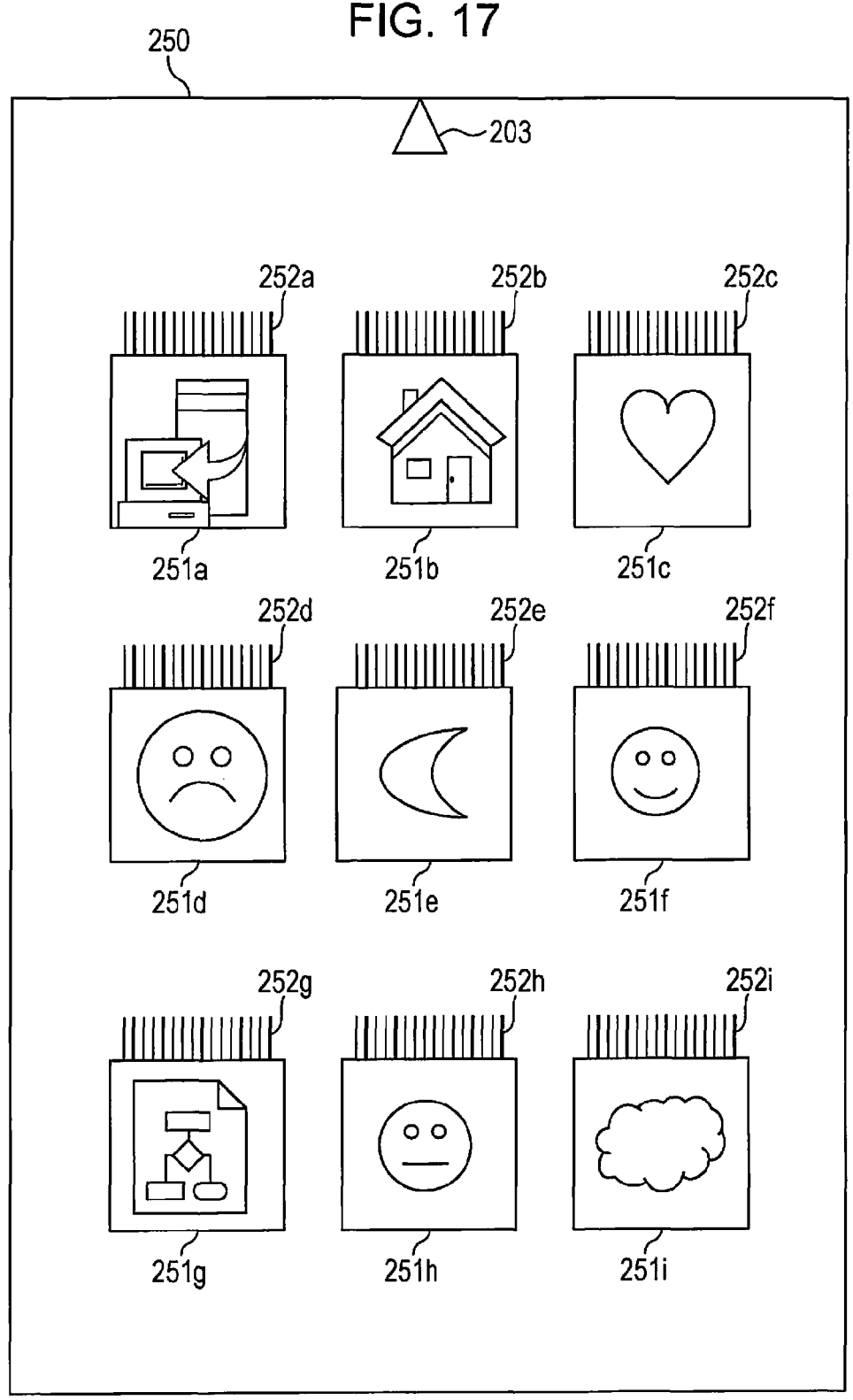
FIG. 17 is a diagram which describes an order sheet on which thumbnail images as mediums are formed.

FIG. 17 is a diagram which describes an order sheet 250 on which thumbnail images are formed as a medium. Thumbnail images 251a to 251i for specifying an image which can be printed using the multifunction printer 100 instead of the diagram for indicating, and barcodes 252a to 252i which uniquely specify the thumbnail images 251a to 251i, respectively, are formed in the order sheet 250.

Also in the third embodiment, the multifunction printer 100 specifies the thumbnail image 251 which is indicated by a user in the order sheet 250 using each of functions of the instruction position specifying unit 301 and the target detecting unit 302 from an imaging result of the camera module 10. Subsequently, the instruction reception unit 303 specifies the original image corresponding to a specified thumbnail image 251. In addition, the processing unit 304 prints the specified original image using the printer unit 50.

Figure 18:
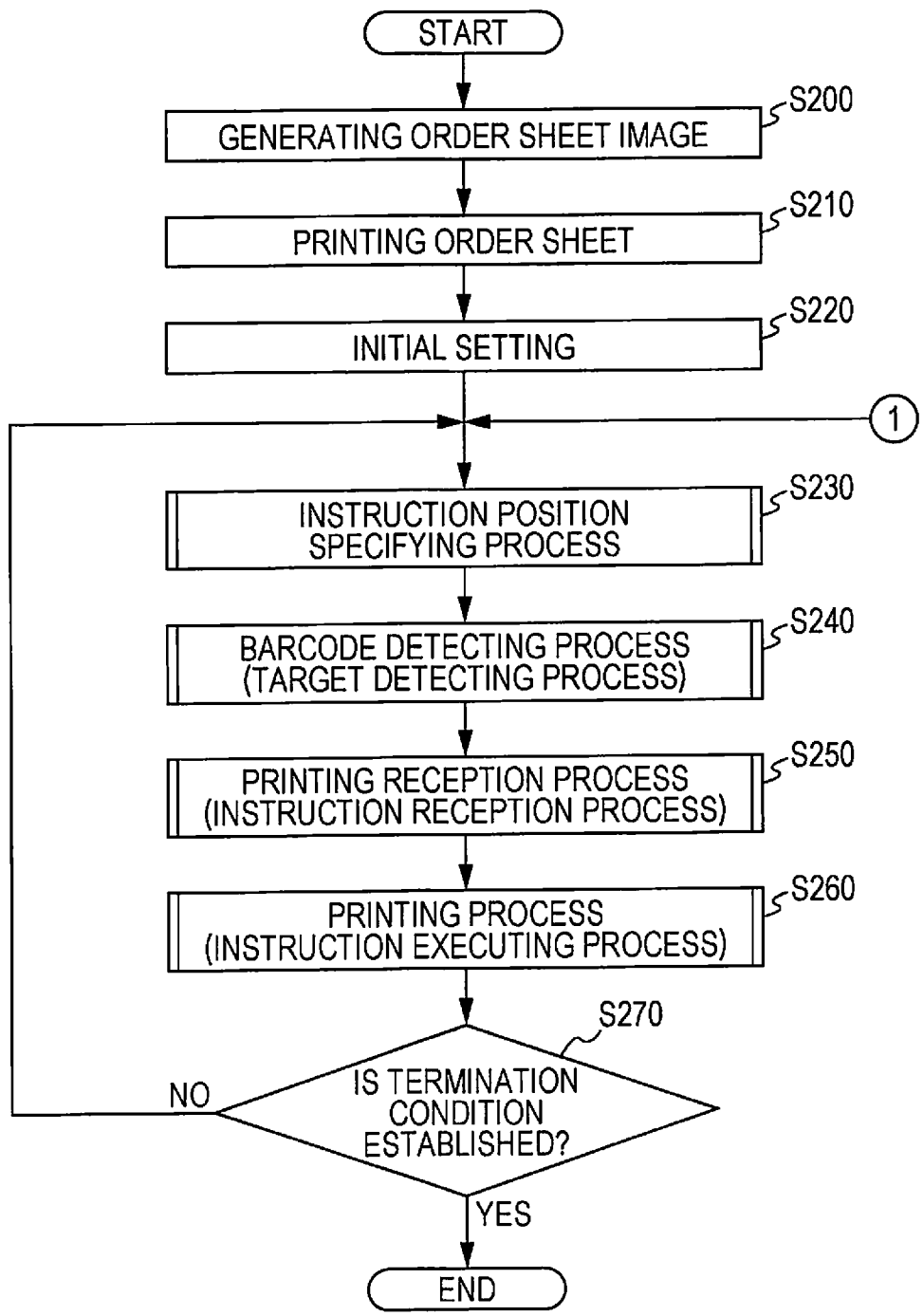
FIG. 18 is a flowchart which describes printing using an order sheet.

FIG. 18 is a flowchart which describes printing using the order sheet 250.

In step S200, the control unit 30 generates an order sheet image for printing the order sheet 250. For example, the control unit 30 generates a thumbnail image from a plurality of the original images which are recorded in the external memory, and generates an order sheet image by combining each thumbnail image. In addition to this, a thumbnail image may be generated from the original image by setting a document which is read in the scanner unit 60 to the original image.

In step S210, the control unit 30 causes the printer unit 50 to print the order sheet 250. For this reason, the printer unit 50 records an order sheet image on a sheet using a coloring material. The processes after step S220 are started by setting the order sheet 250 which is printed in step S210 on the front side of the multifunction printer 100, and causing the camera module 10 to start to read the order sheet.

In step S220, the control unit 30 performs initial setting. Subsequently, in step S230, the control unit 30 performs instruction position specifying process in which a position of the order sheet 250 which is indicated by a user is specified. According to the embodiment, the instruction position specifying unit 301 specifies a position of the thumbnail image in the order sheet 250 which is indicated by a user.

Subsequently, in step S240, the control unit 30 performs the barcode detecting process (target detecting process) based on the position which is specified in step S220. In the barcode detecting process, the target detecting unit 302 detects the barcode 252 on the order sheet 250 which is indicated by the fingertip from coordinates of the specified fingertip.

Subsequently, in step S250, the control unit 30 performs a printing reception process (instruction reception process) based on the detected barcode 252. In the printing reception process, the instruction reception unit 303 receives the original image corresponding to the thumbnail image 251 which is selected by a user as the original image which is a printing target, based on the barcode 252 which is detected in step S240.

In addition, in step S260, the control unit 30 performs a printing process (instruction executing process) in which the original image which is received in step S250 is printed. In the printing process, the processing unit 304 reads the original image which is instructed in step S250, and causes the printer unit 50 to print the original image.

When a termination condition is not established (No in step S270), the control unit 30 returns to step S230. On the other hand, when the termination condition is established (Yes in step S270), the control unit 30 ends the process.

According to the third embodiment with the above described configuration, a user is able to select an image which is desired to be printed by indicating the thumbnail image 251 which is formed on the order sheet 250. For this reason, since it is possible for a user to cause the multifunction printer 100 to print a desired image only by indicating a thumbnail image using a finger, or the like, it is possible to make an operation which is necessary from a selection of a thumbnail image to a printing instruction with respect to the multifunction printer 100 remarkably simple.

4. Other Embodiments

The multifunction printer 100 is exemplified as an electronic apparatus; however it is merely an example. The electronic apparatus may be a printer, a scanner unit, a personal computer (PC), and the like, when it is a product which includes an imaging unit. In addition, the paper manual may be a resin sheet on which a manual is printed, a display which displays a manual, or the like, not necessarily be paper made of a plant.

The barcode is used as a mark; however, it is merely an example. The mark may be any one of a QR code (registered trademark), characters, symbols, images, and the like, as long as it can uniquely specify a target which is indicated by a user.

The camera module which is attached to the multifunction printer is used as the imaging unit; however, it is merely an example. For example, an imaging unit such as a video camera which is attached to a position separated from the multifunction printer, though it is communicably connected to the multifunction printer, may be used.

In the above described embodiments, since a camera which two-dimensionally obtains a position of a fingertip is used, whether or not a manual is touched is determined as information in the depth direction which is three-dimensional by determining whether or not the fingertip enters the depth of field; however, the three-dimensional information may be obtained using another method. Whether or not the manual is touched may be determined by obtaining the three-dimensional information, for example, by using two cameras, or using one camera, and a distance sensor.

When it is a paper manual which is bound like a book, whether a user is going to turn over pages, or is going to make an instruction should be distinguished. For this reason, when being a case which is determined that a user is going to turn over pages, such as a case in which a user touches a page using a plurality of fingers, the touch may not be considered as an instruction.

It is needless to say that the invention is not limited to the above described embodiments. It is needless to say for a person skilled in the art; however, the fact that, members, configurations, and the like, which can be replaced with each other, and are disclosed in the above described embodiments are applied by appropriately changing a combination thereof, the fact that, members, configurations, and the like, which are not disclosed in the above described embodiments but are well-known technologies, and can be replaced with the members, the configuration, and the like, which are disclosed in the above described embodiments each other are applied by being appropriately replaced, or by changing a combination thereof, and the fact that, members, configurations, and the like, which are not disclosed in the above described embodiments but can be assumed as substitutes of the members, the configurations, and the like disclosed in the above described embodiments by the person skilled in the art based on a well-known technology are applied by being appropriately replaced or by changing a combination thereof are disclosed as one embodiment of the invention.

What is claimed is:

1. An electronic apparatus comprising:
a positioning mark which denotes a position to set a medium on which a first mark having a shape corresponding to a process is formed;
an imaging unit configured to capture and generate an image of the medium set to the position;
a controller having a CPU,
the CPU serving as
a detecting unit configured to detect the first mark, which a user selects, by analyzing a location of a finger of the user or an indicator and specify a corresponding process by analyzing the shape of the first mark, which the user selects, based on the image captured by the imaging unit,
and
a processing unit configured to perform the specified process,
wherein the electronic apparatus and the medium are separate members.

2. The electronic apparatus according to claim 1,
wherein the mark uniquely specifies contents of an instruction, and
the CPU further serves as an instruction reception unit which specifies the contents of the instruction specified by the mark, based on the mark which is indicated by the finger of the user or the indicator, and receives the instruction.

3. The electronic apparatus according to claim 1,
wherein the mark corresponds to contents of a plurality of instructions, and
the CPU further serves as an instruction reception unit specifies contents of one instruction from contents of the plurality of instructions corresponding to the mark, based on a relative distance between the mark and the finger of the user or the indicator, and receives the instruction.

4. The electronic apparatus according to claim 3,
wherein the instruction reception unit specifies contents of an instruction based on a distance in a first direction and a distance in a second direction from the mark and the finger of the user or the indicator.

5. A non-transitory computer-readable medium in which a program is stored, the program causes an electronic apparatus, including a positioning mark which denotes a position to set a medium on which a first mark having a shape corresponding to a process is formed, and an imaging unit configured to capture and generate an image of the medium set to the position, to execute
a detecting function which detects the first mark, which a user selects, by analyzing a location of a finger of the user or an indicator and specify a corresponding process by analyzing the shape of the first mark, which the user selects, based on the image captured by the imaging unit,
and
a processing function which performs the specified process,
wherein the electronic apparatus and the medium are separate members.

6. An electronic apparatus comprising:
a positioning mark which denotes a position to set a medium on which a first mark having a shape corresponding to a process is formed;
an imaging unit configured to capture and generate an image of the medium set to the position;
a detecting unit which detects the first mark, which a user selects, by analyzing a location of a finger of the user or an indicator and specify a corresponding process by analyzing the shape of the first mark, which the user selects, based on the image captured by the imaging unit;
and
a processing unit which performs the specified process,
wherein the electronic apparatus and the medium are separate members.

7. The electronic apparatus according to claim 1,
wherein the detecting unit focuses on the finger of the user or the indicator which enters a detecting region of the imaging unit, and detects the mark which is included in a depth of field at the location of the finger of the user or the indicator.

8. The electronic apparatus according to claim 1, wherein the imaging unit is movably attached, the CPU further serves as an instruction reception unit which starts a reception mode in which an instruction of a user is received through the medium, when the imaging unit moves to an instruction reception position, and the reception mode ends when the imaging unit moves to another position from the instruction reception position.

9. The electronic apparatus according to claim 1, wherein the first mark is at least one of a barcode and a QR code.

* * * * *